(12) United States Patent
Inose

(10) Patent No.: US 7,596,750 B2
(45) Date of Patent: Sep. 29, 2009

(54) DATA PROCESSING METHOD, PROGRAM, AND INFORMATION PROCESSOR

(75) Inventor: Koji Inose, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 750 days.

(21) Appl. No.: 10/359,640

(22) Filed: Feb. 7, 2003

(65) Prior Publication Data

US 2003/0154252 A1 Aug. 14, 2003

(30) Foreign Application Priority Data

Feb. 13, 2002 (JP) ............................. 2002-035775
Jan. 28, 2003 (JP) ............................. 2003-018825

(51) Int. Cl.
*G06F 17/00* (2006.01)
*G06F 15/00* (2006.01)
*G06K 15/02* (2006.01)

(52) U.S. Cl. ..................... 715/255; 715/200; 715/243; 715/248; 715/249; 358/1.9; 358/1.11

(58) Field of Classification Search ................ 715/517, 715/530, 200, 243, 248–249, 255; 358/1.9, 358/1.11, 1.1
See application file for complete search history.

(56) References Cited

U.S. PATENT DOCUMENTS 5,007,002 A * 4/1991 Imaizumi et al. ........... 358/1.11
5,068,805 A * 11/1991 Tsuzuki ...................... 345/543
5,208,902 A * 5/1993 Kumon ....................... 358/1.17
5,285,290 A * 2/1994 Sakai et al. .................. 358/404
5,754,192 A * 5/1998 Sugaya ..................... 346/33 R
6,043,823 A * 3/2000 Kodaira et al. .............. 345/619
6,819,441 B2 * 11/2004 Umebayashi ............... 358/1.15
2001/0055426 A1* 12/2001 Yamazaki .................... 382/199
2002/0054345 A1* 5/2002 Tomida et al. .............. 358/1.15
2002/0176101 A1* 11/2002 Tsunekawa .................. 358/1.9
2003/0177448 A1* 9/2003 Levine et al. ................. 715/530
2005/0179935 A1* 8/2005 Ogura et al. ................ 358/1.14

FOREIGN PATENT DOCUMENTS

JP 2-25348 1/1990

OTHER PUBLICATIONS

U.S. Appl. No. 09/493,122, filed Jan. 28, 2000.

* cited by examiner

*Primary Examiner*—Laurie Ries
*Assistant Examiner*—Chau Nguyen
(74) *Attorney, Agent, or Firm*—Fitzpatrick, Cella, Harper & Scinto

(57) ABSTRACT

In a data processing system in which image data representing a form or the like is generated and transmitted via a network, selection is made as to whether data necessary for generating image data or generated image data is stored.

11 Claims, 8 Drawing Sheets

| | | 1 | 2 | 3 | 4 | 5 |
|---|---|---|---|---|---|---|
| 701 | REQUEST ID | 1 | 2 | 3 | 4 | 5 |
| 702 | DATA TYPE | C | C | C | C | I |
| 703 | CHARACTER DATA ID | 1 | 2 | 3 | 4 | — |
| 704 | DIFFERENT FROM | — | 1 | 2 | 1 | — |
| 705 | CONTENT | BOOK PENCIL DESK TABLE | <-> BOOK | <-> PENCIL | <+> BALL | — |

| | | | | | | |
|---|---|---|---|---|---|---|
| 701 | REQUEST ID | 1 | 2 | 3 | 4 | 5 |
| 702 | DATA TYPE | C | C | C | C | I |
| 703 | CHARACTER DATA ID | 1 | 2 | 3 | 4 | 5 |
| 704 | DIFFERENT FROM | — | 1 | 2 | 1 | 4 |
| 705 | CONTENT | BOOK PENCIL DESK TABLE | <-> BOOK | <-> PENCIL | <+> BALL | <+> BAT |
| 901 | DATA SIZE | — | — | — | — | 200 K |

DATA PROCESSING METHOD, PROGRAM, AND INFORMATION PROCESSOR

BACKGROUND OF THE INVENTION

1. Field of the Invention

The present invention relates to a data processing system, a data processing method, an information processor and a program for preparing image data representing a form or the like and transmitting the image data via a network.

2. Related Background Art

In recent years, with the rapid development of the Internet and the increase of Web servers, schemes to replace conventional business operation processing with Web-based processing have been advanced. Business operation processing using a Web browser (hereinafter referred to simply as "browser") capable of display and input of information and simply installed on a personal computer connected to a network has found wide use.

Web servers exist on networks enabling business operations using browsers. Information is exchanged between a client Web browser and a Web server. That is, a Web server receives information input through a browser, processes the information therein, and transmits the processed information to the browser, and the browser displays the processed information. A business operation is performed by a procedure in which such a process is executed a certain number of times and the results of the process are obtained.

In execution of business operations through a Web browser, there is a problem with printing processing necessary for business operations. In particular, in the case of printing of a form or the like through a browser, it is not possible to correctly perform printing in accordance with the format. Ordinary browsers have printing functions but the printing functions of the browsers are intended to make a printer print a hard copy of an image displayed on the browser. Such a printing method has a pagination problem in the case of printing of an image exceeding a print sheet size, a plurality of pages, etc., and does not ensure desired printing results.

On the other hand, a printing processing system has already been proposed in which a server prepares print data according to an instruction from a browser and sends this data to a client.

FIG. 7 is a block diagram showing the configuration of a network printing system, which is a conventional printing processing system. A client has an information processor 101 such as a personal computer (PC). A browser 102 (data input/output section) inputs data from a server and outputs data to the server. A print output section 103 converts data from the browser 102 into standard print data according to an instruction from the browser 102. A printing machine (printer) 104 is connected to the client.

A network 105 connects servers and clients. The form of this network is not limited to a particular kind if it is compatible with communication procedures in Web environments. For example, the network is a local area network (LAN), the Internet, or a wireless network.

A Web server 106 is formed by an information processor. A network communication control section 107 functions mainly as the Web server 106. A form template storage section 108 stores form templates each of which is used when printing of a form is performed.

A data storage section 109 is a database or the like. Data for business operations are stored in the data storage section 109. A data processing section 110 stores an application logic according to each business operation. An image forming section 111 prepares a form image data in accordance with a predetermined style. Form image data may be either of raster image data and vector image data. A print output section 112 converts data (form image data) prepared by the image forming section 111 into a format such that the printer can output the data. The print output section 112 is a unit ordinarily called "printer driver". The printer is indicated by 113.

Processing in the network printing system having the above-described configuration will be described with respect to a case where a user inputs a printing instruction to the browser. Ordinarily, the data processing section 110 on the server performs processing for receiving data from the browser 102, analyzing the received data and, if necessary, searching data in the data storage section 109 according to the received data, and sending back a search result to the browser 102. When the browser functions, buttons are ordinarily displayed on the browser 102. When a user of the browser 102 performs an operation such as clicking of a button on the browser 102, the browser 102 makes a request of the server 106 to perform certain processing, and the server 106 performs this processing and sends back a processing result to the browser 102. In this printing processing system, a printing button is provided in an image display area of the browser 102.

FIG. 8 is a diagram showing a graphical image for business operation processing displayed by the browser. A window 201 of the browser is displayed on a monitor of the PC, for example. A title is indicated in an area 202. Commands provided in the browser 102 are indicated in areas 203 and 204. A command for printing of the contents of a display on the browser is ordinary provided in the areas 203 or 204. When a user selects the printing command indicated in the area 203 or 204, the browser generates print data representing a hard copy of the image displayed in the window 201, and makes the printer print the image based on this print data.

A text field 205 for input/output of the address of a Web server with which a connection is to be established is provided. Field 206 and 207 are provided in which a user makes a selection. A display button 208 is provided. When the display button 208 is clicked, contents selected in the fields 206 and 207 are transmitted to the server side and a response from the server 106 is awaited.

By clicking the display button 208, an image 209 of a form is displayed on the basis of a form name selected in the field 206 and a name of a person selected in the field 207. Simultaneously, a printing button 210 is displayed. The image shown in FIG. 8 represents an example of a personal affairs system. Data on the state of service done in the present month by a person selected in the field 207 is displayed as a monthly form.

The browser receives hypertext markup language (HTML) data for displaying the fields 206 and 207 and the display button 208 from the server, and displays the fields 206 and 207, the display button 208, etc., on the basis of the received HTML data. Also, the browser receives HTML data for displaying the form image 209 and the printing button 210 from the server, and displays the form image 209 and the printing button 210 on the basis of the received HTML data.

When the printing button 210 is clicked, the browser makes a request of the server to send form image data, and delivers to the print output section 102 the form image data transmitted from the server.

Thus, in the above-described proposed printing processing system, the server generates form image data with respect to any of individual instructions without fail and successively returns the image data to the client.

The applicant of the present invention has proposed a printing processing system arranged to improve the efficiency of this processing in such a manner that form image data once generated by a server is temporarily stored in the server, and a client obtains the image data at an arbitrary time. In this system, data on the server is stored for a certain period of time.

The above-described printing processing systems have a problem described below. That is, if concentration of printing instructions in a certain time period occurs to increase the number of data items stored in the, server, i.e., the total data size, the data may, at the worst, overflow the capacity of the storage area of the disk or the like.

SUMMARY OF THE INVENTION

In view of the above-described circumstances, an object of the present invention is to provide a printing processing system, a printing processing method, a program and a storage medium designed to reduce the chance of data overflowing the capacity of a storage area when a server stores data.

Thus, in one aspect, the invention is directed to a data processing method carried out to transmit image data from a first information processor capable of generating image data to a second information processor. The method has a selection step in which selection of storage of data necessary for generating image data or storage of generated image data is performed. A first generation step generates image data from data necessary for generating the image data according to a generation request from the second information processor to the first information processor if storage of generated image data is selected in the selection step. A second generation step generates image data from data necessary for generating the image data according to an acquisition request from the second information processor to the first information processor if storage of data necessary for generation of image data is selected in said selection step. Then, a transmission step transmits the image data generated in the first or second generation step from the first information processor to the second information processor according to the acquisition request from the second information processor to the first information processor.

In another aspect, the invention is directed to a data processing method carried out to transmit image data from a first information processor capable of generating image data to a second information processor. The method has an issue step of issuing identification information necessary for obtaining image data according to a generation request of image data from the second information processor to the first information processor. A selection step selects storage of data necessary for generating image data or storage of generated image data according to a generation request of image data from the second information processor to the first information processor. A storage step stores the identification information issued in the issue step and data type information indicating the result of selection in the selection step while relating the identification information and the data type information to each other. A first generation step generates image data from data necessary for generating the image data according to a generation request of image data from the second information processor to the first information processor if storage of generated image data is selected in the selection step. A second generation step of generates image data from data necessary for generating the image data on the basis of data type information corresponding to identification information designated by an image data acquisition request from the second information processor to the first information processor. A transmission step transmits the image data generated in the first or second generation step from the first information processor to the second information processor according to the data type information corresponding to the identification information designated by the image data acquisition request from the second information processor to the first information processor. Then, a changing step changes the data type information indicating the selection of storage of the generated image data into the data type information indicating the selection of storage of the data necessary for generating the image data if a predetermined condition is satisfied.

This brief summary has been provided so that the nature of the invention may be understood quickly. A more complete understanding of the invention can be obtained by reference to the following detailed description of the preferred embodiments thereof in connection with the attached drawings.

DESCRIPTION OF THE PREFERRED EMBODIMENTS

Figure 1:
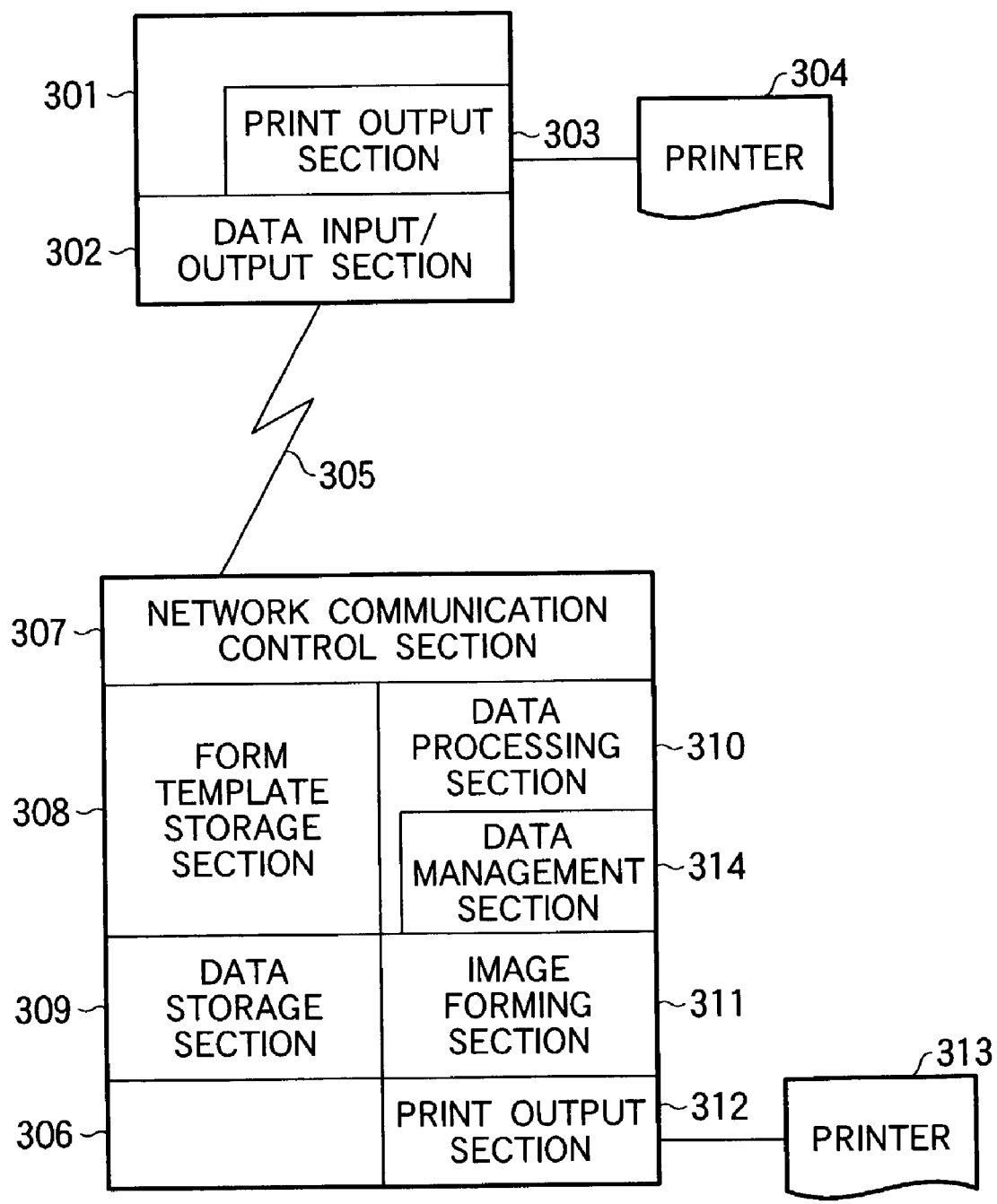
FIG. 1 is a block diagram showing the configuration of a network printing system.
Figure 7:
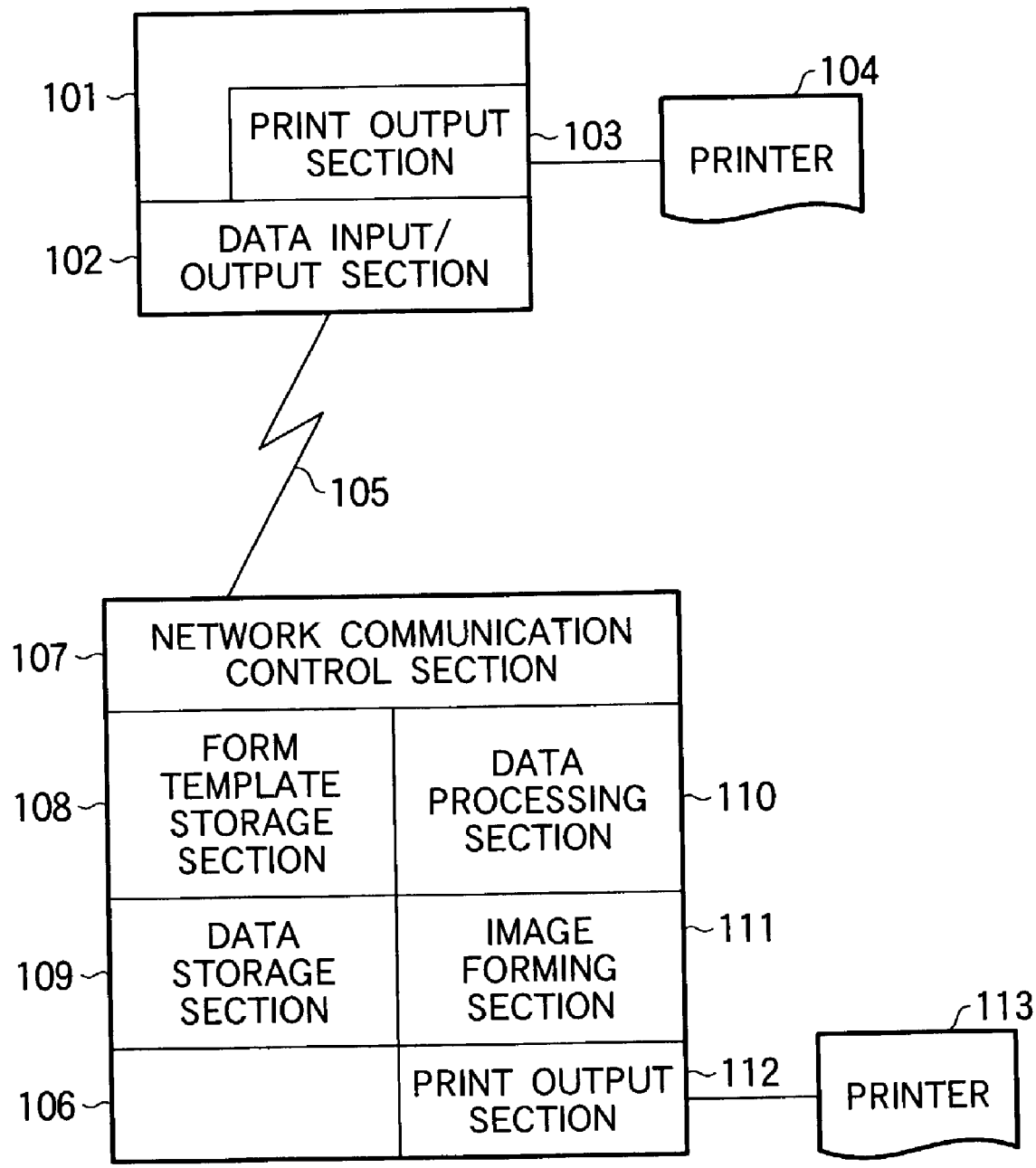
FIG. 7 is a block diagram showing the configuration of a conventional network printing system.
Figure 8:
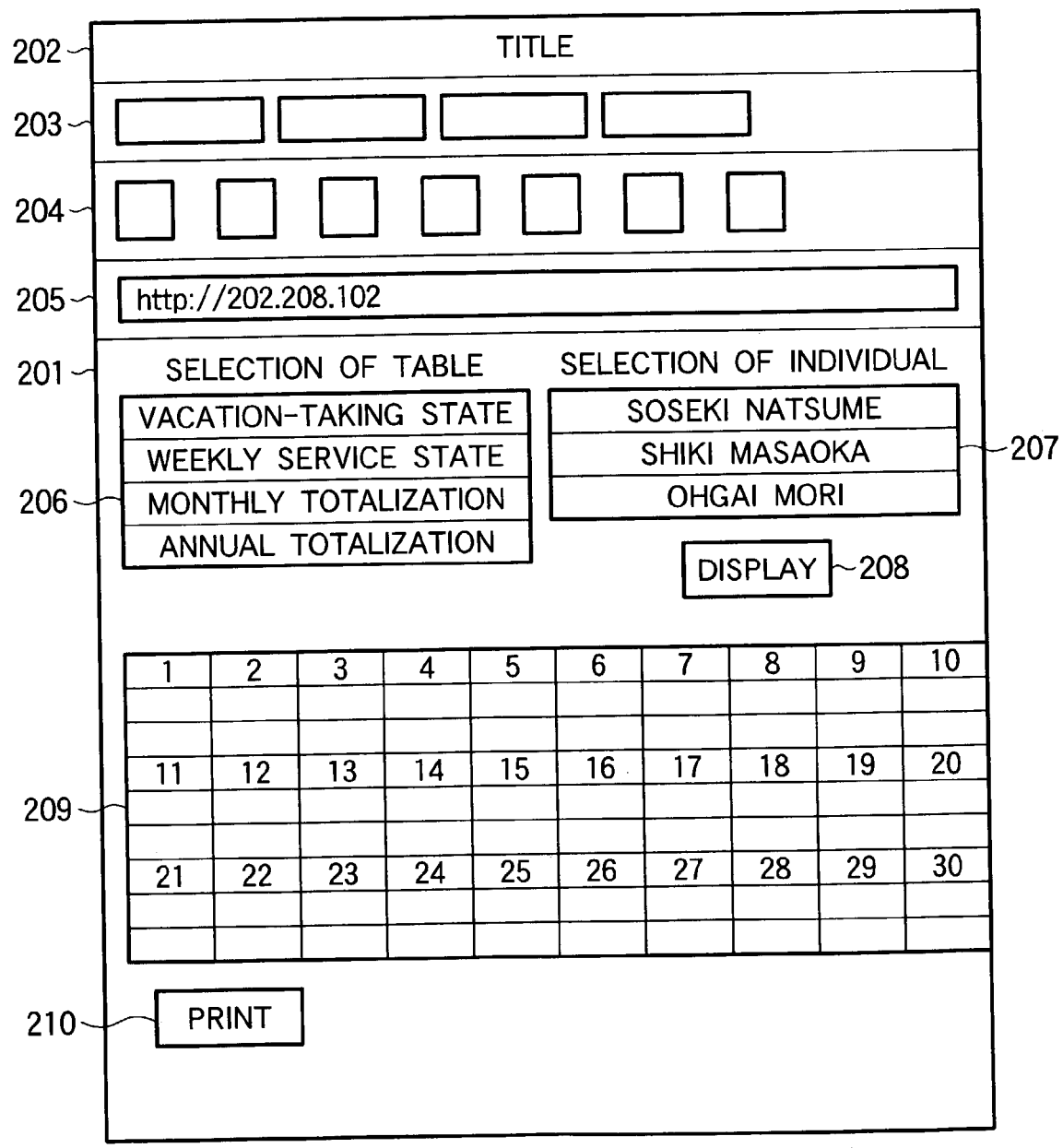
FIG. 8 is a diagram showing an image for business operation processing displayed by a browser.

A printing processing system, a printing processing method, a program and a storage medium which represent an embodiment of the present invention will be described with reference to the accompanying drawings. FIG. 1 is a block diagram showing the configuration of a network printing system which is a printing processing system in the embodiment. Reference characters 301 to 313 indicate the same components as those indicated by characters 101 to 113 in FIG. 7. A client has an information processor 301 such as a PC. That is, a browser 302 (data input/output section) inputs data from a server and outputs data to the server. A print output section 303 converts data from the browser 302 into standard print data according to an instruction from the browser 302. A printing machine (printer) 304 is connected to the client.

A network 305 connects servers and clients. The form of this network is not limited to a particular kind if it is compatible with communication procedures in Web environments. For example, the network is a LAN, the Internet, or a wireless network.

A Web server 306 is formed by an information processor. A network communication control section 307 functions mainly as the Web server 306. A form template storage section 308 stores form templates each of which is used when printing of a form is performed.

A data storage section 309 is a database or the like. Data for business operations are stored in the data storage section 309.

A data processing section 310 stores an application logic according to each business operation. An image forming section 311 prepares a form image data in accordance with a predetermined style. Form image data may be either of raster image data and vector image data. A print output section 312 converts data (form image data) prepared by the image forming section 311 into a format such that the printer can output the data. The print output section 312 is a unit ordinarily called "printer driver". The printer is indicated by 313.

A data management section 314 is newly added as a feature of this embodiment of the present invention. The data management section 314 has the functions of performing processing for selectively and effectively storing form image data and form character data dynamically generated, reconstructing form character data, and making a request of the image forming section 311 to generate form image data.

In this embodiment, the data processing section 310, the data management section 314 and the image forming section 311 are realized by a program executed by a CPU in the Web server.

Figures 2, 3:
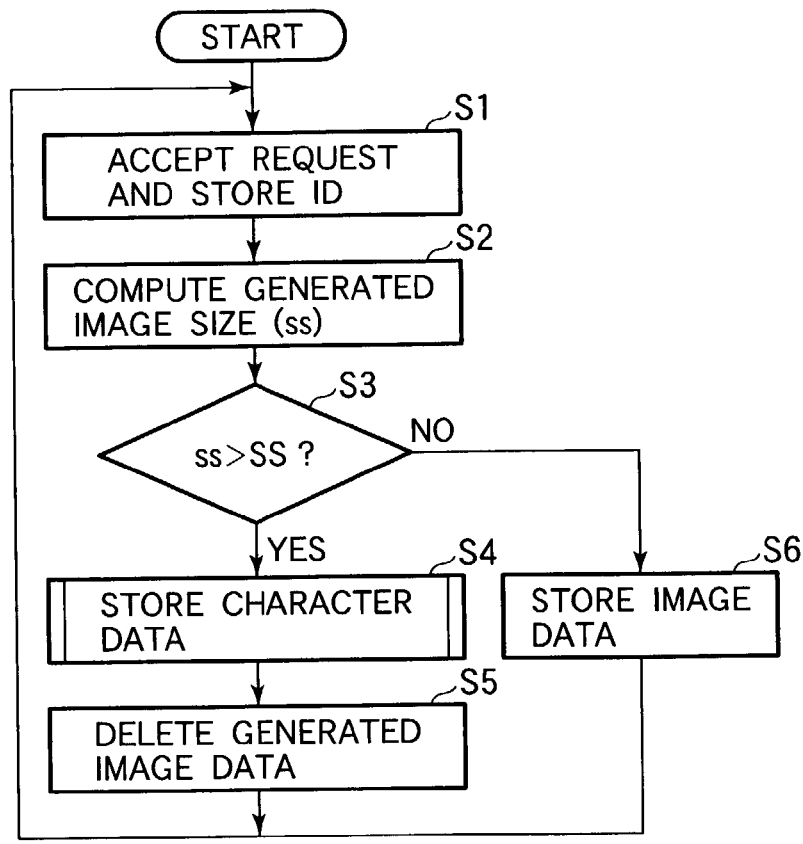
FIG. 2 is a flowchart showing a storage selection processing procedure.
FIG. 3 is a form character data management table.

A process in which the server 306 selects storage of form character data or storage of form image data in a printing processing system having the above-described configuration will next be described. FIG. 2 is a flowchart showing storage selection processing procedure. FIG. 3 shows a management table showing the contents of character data stored at a certain time. This table is held in a predetermined storage area in the Web server 306.

First, a request from a client 301 is accepted and a number necessary for acquisition of form image data is issued as a request ID and stored (step S1). In the case shown in FIG. 3, request IDs "1 to 5" are stored (see section 701 of FIG. 3). Then the size ss of form image data generated is computed and recorded (step S2).

Determination is made as to whether or not the size ss of the form image data obtained in step S2 is larger than a value SS externally given (step S3). This value SS is set to such a value that the capacity of a storage area of the Web server 306 does not overflow with data. If the size ss of the generated form image data is larger, basic form character data is stored (step S4), while the generated form image data is deleted (step S5). At this time, a value "C" which denotes that the type of data stored is form character data is stored in the table (see section 702 of FIG. 3). Storage of this form character data is as described below in detail.

If it is determined in step S3 that the value SS externally given is equal to or larger than the size ss, the form image data is stored (step S6). At this time, a value "I" which denotes that the type of data stored is form image data is stored in the table (see section 702 of FIG. 3). Characters or sequences of characters indicating the type of data are not limited to "C" and "I" and may be arbitrarily selected.

Figures 4, 5:
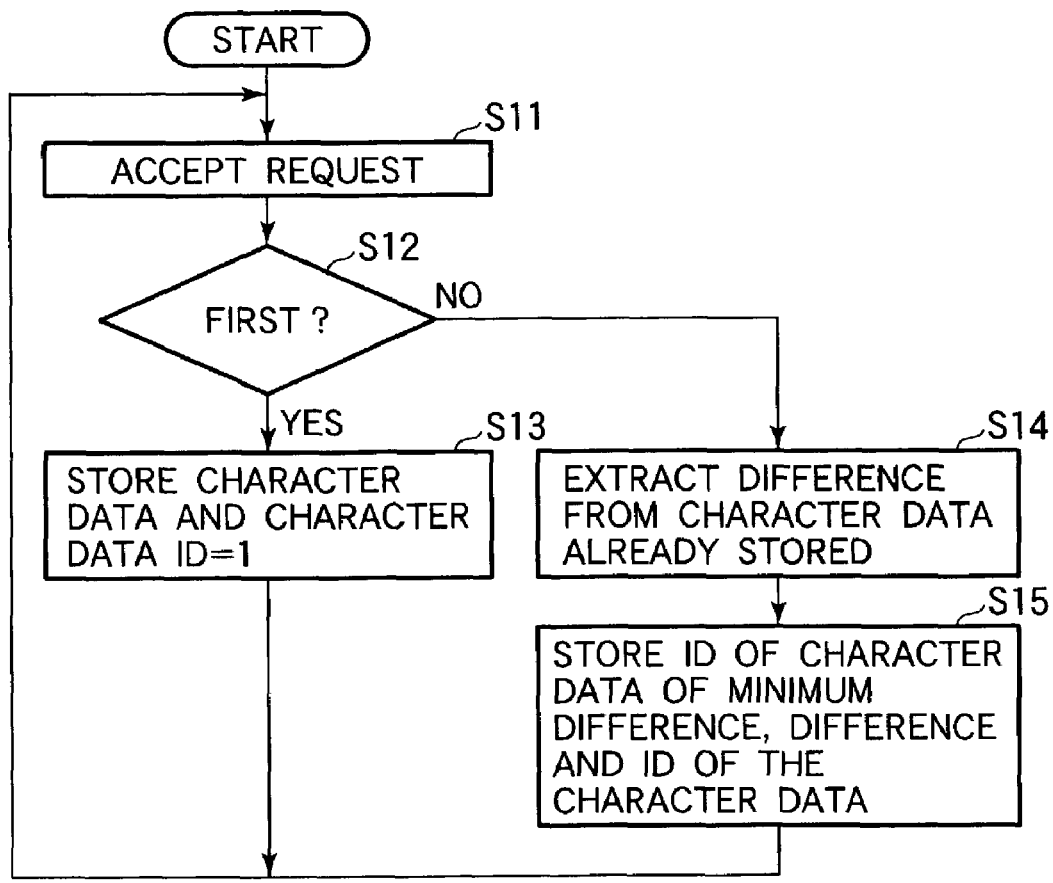
FIG. 4 is a flowchart showing a form character data storage processing procedure.
FIG. 5 is a table showing an example of form character data.

A process in which when the server 306 stores form character data dynamically generated, it stores only the difference of the generated character data from character data already stored will next be described. FIG. 4 is a flowchart showing a basic form character data storage processing procedure in step S4.

A request is first accepted (step S11) and determination is made as to whether or not this processing is first (first-time) processing (step S12). In the case of first processing, character data itself (see section 705 of FIG. 3) and a character data ID=1 (see section 703 of FIG. 3) are stored in the table of FIG. 3 (step S13).

If it is determined in step S12 that the present processing is second (second-time) processing or processing subsequent to the second processing, the difference from each of the groups of character data already stored is extracted (step S14), one of the plurality of stored groups of character data corresponding to the smallest difference is selected, and the ID of the selected group of character data (see section 704 of FIG. 3) and the contents of the difference (see section 705 of FIG. 3) are recorded in the table of FIG. 3 (step S15).

FIG. 5 is a table showing an example of form character data. In FIG. 5, a character data ID and stored characters are shown with respect to each group of form character data. It is assumed here that character data ID=3, for example, is presently recorded in the table of FIG. 3, and that the next character data (character data with ID=4 shown in FIG. 5) is input. In this case, it is determined in step S14 that the group of character data with ID=1 in the groups of character data with IDs=1 to 3 is the one corresponding to the smallest difference. Then, in step S15, ID=1 is stored in section 704 in correspondence with character ID=4 and the difference "<+>Ball" from this character data is stored in section 705. This data "<+>Ball" represents "plus difference "Book" from the character data with ID=1". In FIG. 3, <+> denotes a plus difference and <−> denotes a minus difference. The form character data shown in FIG. 5 is stored as shown in FIG. 3.

Figure 6:
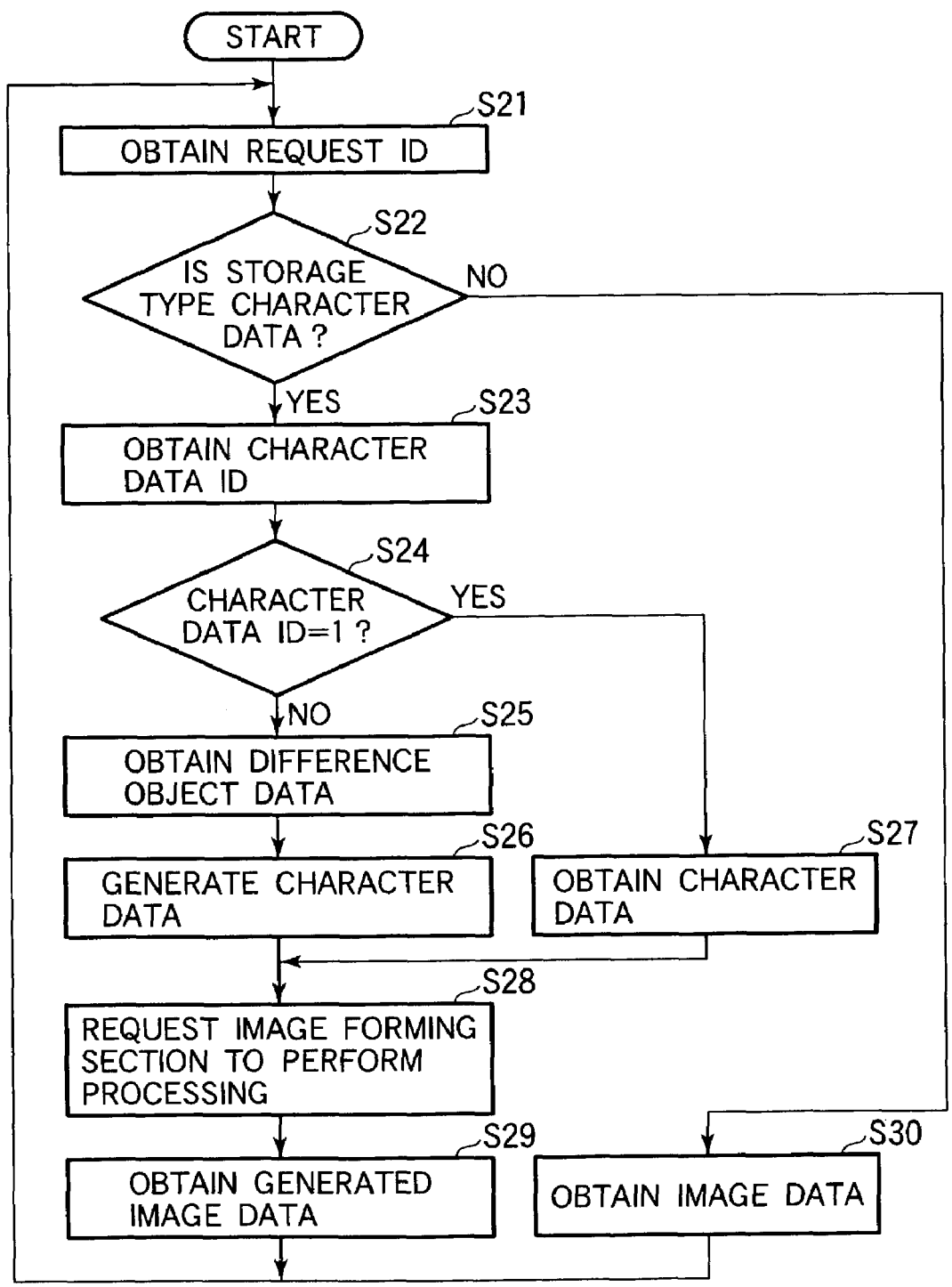
FIG. 6 is a flowchart showing a procedure of processing for transmitting form image data.

A process in which after the server 306 has received a form image data acquisition request from the client 302, it transmits form image data to the client. FIG. 6 is a flowchart showing a procedure of processing performed by the server 306 to transmit form image data to the client 302.

When an image data acquisition request from the client 302, accompanied by a request ID, is accepted, the request ID designated by the acquisition request is obtained (step S21). Determination is then made as to whether the corresponding stored data is character data or image data (step S22). This determination is made according to whether the value in the section "data type" of the column corresponding to the obtained request ID is "C" or "I", as described above.

If it is determined that the stored data is character data, the character data ID is obtained from the designated request ID (step S23). Determination is made as to whether the obtained character data ID is 1 (step S24). If the character data ID is not 1, the data stored in the sections 704 and 705 of FIG. 3 are obtained for reconstruction of the character data (step S25) to reconstruct the character data (step S26).

For example, if the character with the ID=3 in FIG. 5 is reconstructed, the value in the section 703 corresponding to the character data ID=3 is read. It is thereby found that the character data ID of the character data which is the sum of the required data and the difference is 2. Further, it can be understood that the sum of the character data with ID=2 and the difference corresponds to the character data with ID=1. That is, the character data "Pencil, Desk, Table" with ID=2 is reconstructed by removing "Book" from the character data "Book, Pencil, Desk, Table" with ID=1. Subsequently, the character data "Desk, Table" with ID=3 is reconstructed by removing "Pencil" from the character data "Pencil, Desk, Table" with ID=2.

If it is determined in step S24 that the ID is 1, the character data is obtained simply from the table of FIG. 3 (step S27).

The character data reconstructed in step S26 or the character data obtained in step S27 is sent to the image forming section 311 (step S28). The image forming section 311 generates form image data on the basis of the form character data sent to it. The form image data generated by the image forming section 311 is then obtained (step S29). The obtained form image data is transmitted to the client that transmitted the form image data acquisition request. The process then returns to processing in step S21.

If it is determined in step S22 that the data type is image data ("I"), processing for simply obtaining the stored form image data (step S30) and the obtained form image data is transmitted to the client that transmitted the form image data acquisition request. The process then returns to processing in step S21.

In step S6 of FIG. 2, only the generated form image data is stored. However, if the capacity of the storage area is sufficiently large, both the generated form image data and form character data may be stored in such a manner that the form image data is deleted according to a reduction in available storage area and, finally, only the form character data is stored.

Figures 9, 10:
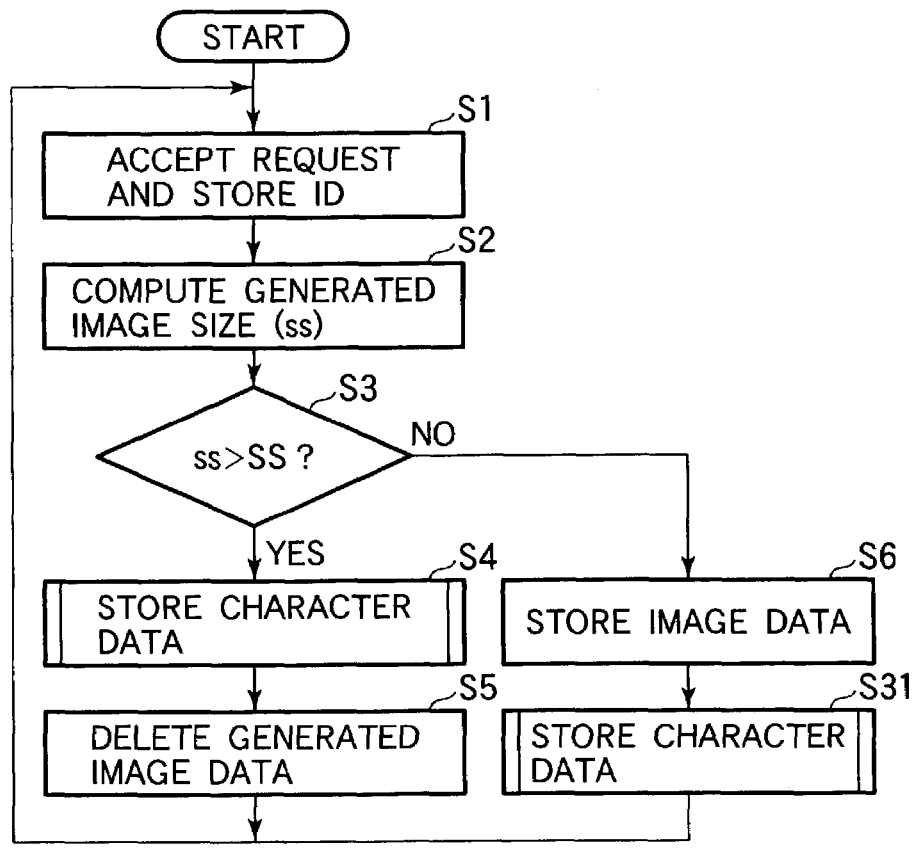
FIG. 9 is a flowchart showing a storage selection processing procedure.
FIG. 10 is a form character data management table.

Referring to FIG. 9, a step S31 is added after step S6 in FIG. 2. Accordingly, while the generated form image data is stored, form character data necessary for generating the form image data is also stored. In step S6, the size of form image data (see section 901 of FIG. 10) is stored in a table shown in FIG. 10. Step S31 is equivalent to step S4.

FIG. 10 shows a management table formed by processing shown in FIG. 9. The management table shown in FIG. 10 has a section 901 in addition to those shown in the management table shown in FIG. 3. Also, since form character data corresponding to a request ID=5 is stored, data is stored in sections 703, 704, and 705 in correspondence with the column of request ID=5.

Figure 11:
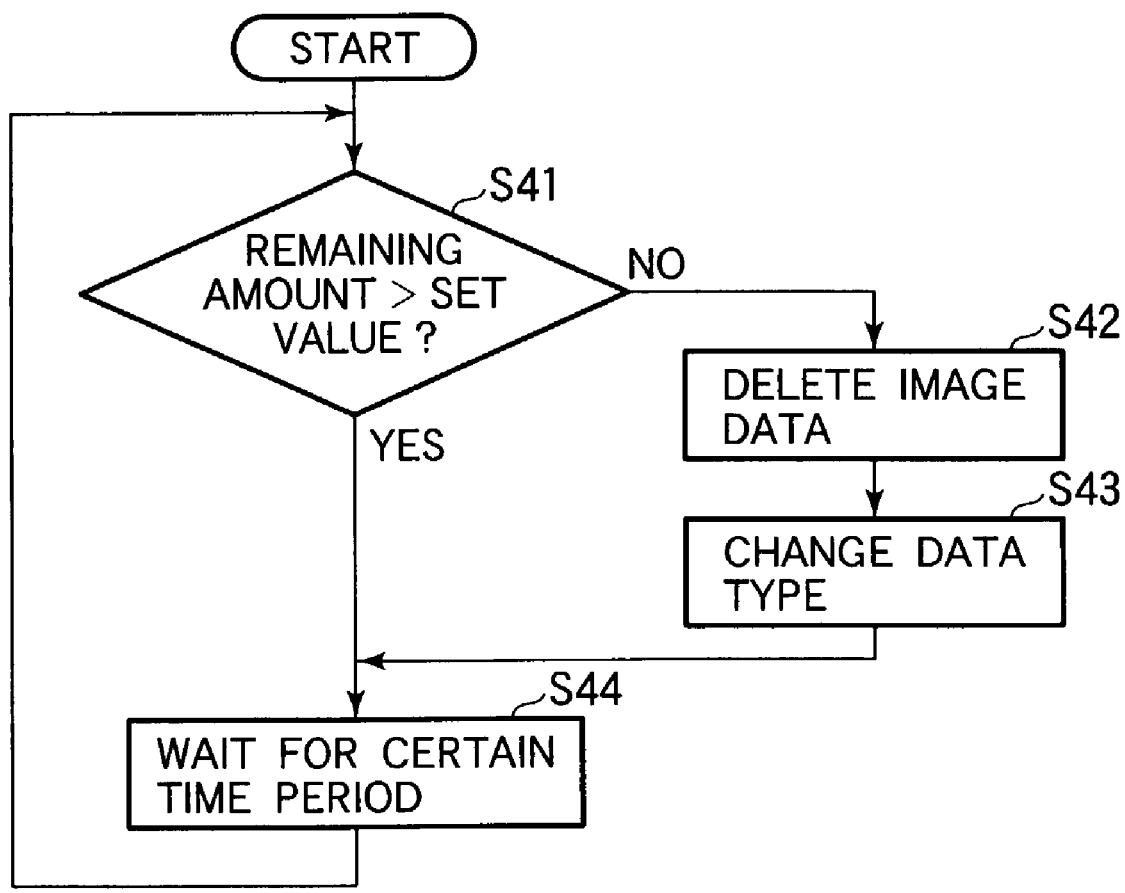
FIG. 11 is a flowchart showing a procedure of processing for deleting form image data and leaving only form character data as an objet to be stored.

A process in which the server 306 deletes form image data to leave only form character data as a stored object will be described with reference to FIG. 11. FIG. 11 is a flowchart showing a procedure of processing for deleting from image data and leaving only form character data as a stored object.

In this process, the remaining capacity of the storage area for storing data is checked in a fixed time interval and the remaining capacity and a set value is compared with each other (S41). If it is determined from the comparison that the remaining capacity is larger than the set value, a wait is made for passage of a certain period of time (step S44).

If the remaining capacity is equal to or smaller than the set value, one of the stored groups of image data smallest in data size is selected and the selected image data is deleted (step S42). In the portion of the request ID column corresponding to the deleted image data, the data type value is changed from "I" to "C" and the data size value is erased (step S43).

The time required to regenerate form image data smaller in data size is supposed to be shorter. Therefore, image data smaller in data size is deleted with precedence. However, form image data to be deleted may be selected on the basis of a factor other than the data size.

In this embodiment, as described above, the storage area used in the Web server 306 can be limited in such a manner that when the client 301 sends a form image data acquisition request to the Web server 306, the Web server 306 minimizes the size of data to be stored before it stores the data. The chance of data overflowing the capacity of the storage area in the Web server can be reduced in this manner and users or system administrators can be provided with a frustration-free image forming environment.

While the embodiment of the present invention is as described above, the present invention is not limited to the described embodiment and can be applied to any arrangement if the functions included in claims or the functions of the arrangement of the embodiment can be performed.

In the above-described embodiment, if it is determined in step S12 that the present processing is the second processing or processing subsequent to the second processing, a group of character data having the smallest difference from those already stored is selected and the contents of the difference is stored in step S15. However, it is not necessarily required that data corresponding to the smallest difference be recorded. For example, the contents of the difference from particular print data may be recorded.

In a case where the present invention is attained by supplying a system or an apparatus with program codes of software for realizing the above-described functions of the embodiment, the program codes themselves realize the novel functions of the present invention and a recording medium on which the program is recorded constitutes the present invention.

In the above-described embodiment, the program codes shown in the flowchart of FIGS. 2, 4, 6, 9, or 11 are stored on a ROM, i.e., a storage medium. Any storage medium other than ROM may be used to supply the program codes. For example, a flexible hard disk, a hard disk, a compact disc-read only memory (CD-ROM), CD-R, a digital versatile disk, a magnetic tape, or a nonvolatile memory card may be used.

According to the present invention, when image data is stored in a server, the chance of the data overflowing the capacity of the storage area can be reduced to provide users or system administrators with a frustration-free image forming environment.

What is claimed is:

1. A data processing method including a first information processor to transmit image data from the first information processor that generates the image data from fixed data and variable data to a second information processor, said data processing method comprising:

a determination step of determining whether or not a storage capacity of a predetermined memory is larger than a capacity of the generated image data;

a storing step of storing the generated image data in a case where it is determined in said determination step that the storage capacity of the predetermined memory is larger than the capacity of the generated image data, and storing data necessary for generating the image data that comprises at least one of character data and vector data in a case where it is determined in said determination step that the storage capacity of the predetermined memory is not larger than the capacity of the generated image data, wherein when the character data is stored as the data necessary for generating the image data, first character data, an ID indicating the first character data, a difference between the first character data and second character data, and an ID indicating the difference, are stored in a table;

a first generation step of generating image data from the data necessary for generating the image data according to a generation request from the second information processor to the first information processor if the generated image data is stored in said storing step, and then storing the generated image data;

a second generation step of generating the image data from the data necessary for generating the image data according to an acquisition request from the second information processor to the first information processor if the data necessary for generating the image data is stored in said storing step, and then storing the data necessary for generating the image data without storing the generated image data; and a transmission step of transmitting the generated image data generated in said first generation step or second generation step from the first information processor to the second information processor according to the acquisition request from the second information processor to the first information processor.

2. The data processing method according to claim 1, further comprising a size computation step of computing data size of the generated image data.

3. The data processing method according to claim 1, further comprising:
an issue step of issuing identification information necessary for obtaining the image data according to said generation request; and
a storage step of storing the identification information issued in said issue step and the data necessary for generating the image data while relating the identification information and the data necessary for generating the image data to each other,
wherein, in said second generation step, the image data is generated on the basis of the data necessary for generating the image data, which data is stored by being related to the identification information designated by the acquisition request, and wherein, in said transmission step, the image data corresponding to the identification information designated by the acquisition request is transmitted.

4. The data processing method according to claim 1, further comprising a printing step of performing printing on the basis of the image data, wherein the image data comprises image data representing a form, and the data necessary for generating the image data comprises the character data.

5. A computer-readable storage medium on which is stored a computer-executable program, the computer-executable program for a first information processor to transmit image data from the first information processor that generates the image data from fixed data and variable data to a second information processor, said computer-executable program enabling a computer to execute:
a determination step of determining whether or not a storage capacity of a predetermined memory is larger than a capacity of the generated image data;
a storing step of storing the generated image data in a case where it is determined in said determination step that the storage capacity of the predetermined memory is larger than the capacity of the generated image data, and storing data necessary for generating the image data that comprises at least one of character data and vector data in a case where it is determined in said determination step that the storage capacity of the predetermined memory is not larger than the capacity of the generated image data, wherein when the character data is stored as the data necessary for generating the image data, first character, an ID indicating the first character data, a difference between the first character data and second character data and an ID indicating the difference, are stored in a table;
a first generation step of generating image data from the data necessary for generating the image data according to a generation request from the second information processor to the first information processor if the generated image data is stored in said storing step, and then storing the generated image data;
a second generation step of generating the image data from the data necessary for generating the image data according to an acquisition request from the second information processor to the first information processor if the data necessary for generating the image data is stored in said storing step, and then storing the data necessary for generating the image data without storing the generated image data; and
a transmission step of transmitting the generated image data generated in said first generation step or said second generation step from the first information processor to the second information processor according to the acquisition request from the second information processor to the first information processor.

6. The computer-readable storage medium according to claim 5, further comprising a size computation step of computing data size of the generated image data.

7. The computer-readable storage medium according to claim 5, further comprising:
an issue step of issuing identification information necessary for obtaining the image data according to the generation request; and
a storage step of storing the identification information issued in said issue step and the data necessary for generating the image data while relating the identification information and the data necessary for generating the image data to each other,
wherein, in said second generation step, the image data is generated on the basis of the data necessary for generating the image data, which data is stored by being related to the identification information designated by said acquisition request, and wherein, in said transmission step, the image data corresponding to the identification information designated by said acquisition request is transmitted.

8. An information processor which generates image data from fixed data and variable data and transmits the generated image data to an external information processor, said information processor comprising:
determination means for determining whether or not a storage capacity of a predetermined memory is larger than a capacity of the generated image data;
storing means for storing the generated image data in a case where it is determined by said determination means that the storage capacity of the predetermined memory is larger than the capacity of the generated image data, and storing data necessary for generating the image data that comprises at least one of character data and vector data in a case where it is determined by said determination means that the storage capacity of the predetermined memory is not larger than the capacity of the generated image data, wherein when the character data is stored as the data necessary for generating the image data, first character data, an ID indicating the first character data, a difference between the first character data and second character data and an ID indicating the difference, are stored in a table;
first generation means for generating image data from the data necessary for generating the image data according to a generation request from the external information processor to the information processor if the generated image data is stored in said storing means, and then storing the generated image data;
second generation means for generating image data from the data necessary for generating the image data according to an acquisition request from the external information processor to the information processor if the data necessary for generating the image data is stored in said storing means, and then storing the data necessary for generating the image data without storing the generated image data; and
transmission means for transmitting the generated image data generated by said first generation means or said second generation means to the external information processor according to the acquisition request from the external information processor.

9. An information processor which generates image data from fixed data and variable data and transmits the generated image data to an external information processor, said information processor comprising:

determination means for determining whether or not a storage capacity of a predetermined memory is larger than a capacity of the generated image data;

storing means for storing the generated image data in a case where it is determined by said determination means that the storage capacity of the predetermined memory is larger than the capacity of the generated image data, and storing data necessary for generating the image data that comprises at least one of character data and image data in a case where it is determined by said determination means that the storage capacity of the predetermined memory is not larger than the capacity of the generated image data, wherein when the character data is stored as the data necessary for generating the image data, first character data, an ID indicating the first character data, a difference between the first character data and second character data and an ID indicating the difference, are stored in a table;

first generation means for generating the image data from the data necessary for generating the image data, transmitting the generated image data to the external information processor, releasing the transmitted image data, and storing the data necessary for generating the image data, if the generated image data is stored by said storing means; and second generation means for generating the image data from the data necessary for generating the image data, transmitting the generated image data to the external information processor, and storing the transmitted image data, if the data necessary for generating the image data is stored by said storing means.

10. A method including an information processor which generates image data from fixed data and variable data and transmits the generated image data to an external information processor, said method comprising:

a determination step of determining whether or not a storage capacity of a predetermined memory is larger than a capacity of the generated image data;

a storing step of storing the generated image data in a case where it is determined in said determination step that the storage capacity of the predetermined memory is larger than the capacity of the generated image data, and storing data necessary for generating the image data that comprises at least one of character data and vector data in a case where it is determined in said determination step that the storage capacity of the predetermined memory is not larger than the capacity of the generated image data, wherein when the character data is stored as the data necessary for generating the image data, first character data, an ID indicating the first character data, a difference between the first character data and second character data and an ID indicating the difference, are stored in a table;

a first generation step of generating the image data from the data necessary for generating the image data, transmitting the generated image data to the external information processor, releasing the transmitted image data, and storing the data necessary for generating the image data, if the generated image data is stored by said storing step; and a second generation step of generating the image data from the data necessary for generating the image data, transmitting the generated image data to the external information processor, and storing the transmitted image data, if the data necessary for generating the image data is stored by said storing step.

11. A computer-readable storage medium on which is stored a computer-executable program for an information processor to generate image data from fixed data and variable data and transmit the generated image data to an external information processor, said computer-executable program enabling a computer to execute:

a determination step of determining whether or not a storage capacity of a predetermined memory is larger than a capacity of the generated image data;

a storing step of storing the generated image data in a case where it is determined in said determination step that the storage capacity of the predetermined memory is larger than the capacity of the generated image data, and storing data necessary for generating the image data comprising at least one of character data and vector data in a case where it is determined in said determination step that the storage capacity of the predetermined memory is not larger than the capacity of the generated image data, wherein when the character data is stored as the data necessary for generating the image data, first character data, an ID indicating the first character data, a difference between the first character data and second character data and an ID indicating the difference, are stored in a table;

a first generation step of generating the image data from the data necessary for generating the image data, transmitting the generated image data to the external information processor, releasing the transmitted image data, and storing the data necessary for generating the image data, if the generated image data is stored by said storing step; and a second generation step of generating the image data from the data necessary for generating the image data, transmitting the generated image data to the external information processor, and storing the transmitted image data, if the data necessary for generating the image data is stored by said storing step.

* * * * *